United States Patent
Weissert

(10) Patent No.: US 10,640,837 B2
(45) Date of Patent: May 5, 2020

(54) VEHICLE INTERIOR PANEL WITH LASER-FORMED TEAR SEAM

(71) Applicant: Faurecia Interior Systems, Inc., Auburn Hills, MI (US)

(72) Inventor: Ulrich Weissert, Northville, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 26 days.

(21) Appl. No.: 15/717,190

(22) Filed: Sep. 27, 2017

(65) Prior Publication Data

US 2019/0093185 A1 Mar. 28, 2019

(51) Int. Cl.
| | |
|---|---|
| *B23K 26/40* | (2014.01) |
| *C14B 5/00* | (2006.01) |
| *B23K 26/0622* | (2014.01) |
| *B60R 13/02* | (2006.01) |
| *B23K 26/364* | (2014.01) |
| *B60R 21/2165* | (2011.01) |
| *B23K 103/00* | (2006.01) |
| *B60R 21/205* | (2011.01) |

(52) U.S. Cl.
CPC ............ *C14B 5/00* (2013.01); *B23K 26/0624* (2015.10); *B23K 26/364* (2015.10); *B23K 26/40* (2013.01); *B60R 13/0256* (2013.01); *B60R 21/2165* (2013.01); *B23K 2103/34* (2018.08); *B60R 21/205* (2013.01)

(58) Field of Classification Search
CPC .............................................. B23K 26/0624; B23K 26/364; B23K 26/386; B23K 26/40; B23K 26/402
See application file for complete search history.

(56) References Cited

U.S. PATENT DOCUMENTS

| | | |
|---|---|---|
| 5,744,776 A | 4/1998 | Bauer |
| 6,267,918 B1 | 7/2001 | Bauer |
| 6,294,124 B1 | 9/2001 | Bauer et al. |
| 6,313,434 B1 * | 11/2001 | Patterson ............... B23K 26/02 219/121.69 |

(Continued)

FOREIGN PATENT DOCUMENTS

| | | | |
|---|---|---|---|
| DE | 102005012720 A1 * | 9/2006 | ............ B60R 13/02 |
| EP | 0963806 A1 | 12/1999 | |

(Continued)

OTHER PUBLICATIONS machine translation of Japan Patent document No. 2001-097,164-A, Jul. 2019.*

(Continued)

*Primary Examiner* — Geoffrey S Evans
(74) *Attorney, Agent, or Firm* — Reising Ethington P.C.

(57) ABSTRACT

An upholstery layer of a vehicle interior panel includes an airbag tear seam formed as a plurality of blind cuts arranged along a tear seam pattern. Each one of the blind cuts is formed by laser material removal at a plurality of locations along the pattern. Laser energy is delivered to the upholstery layer in a series of ultra-short pulses to form the blind cuts, which are formed in the upholstery layer while separate from a substrate of the panel. This technique is particularly useful with leather upholstery materials, in which non-visible airbag tear seams have been proven difficult to form.

15 Claims, 4 Drawing Sheets

(56) References Cited

U.S. PATENT DOCUMENTS

| | | | |
|---|---|---|---|
| 6,337,461 B1* | 1/2002 | Yasuda | B23K 26/032 |
| | | | 219/121.62 |
| 6,808,197 B2 | 10/2004 | Bauer et al. | |
| 7,297,897 B2 | 11/2007 | Nicholas et al. | |
| 7,919,036 B2 | 4/2011 | Bauer | |
| 7,976,764 B2 | 7/2011 | Schlemmer et al. | |
| 2003/0230875 A1* | 12/2003 | Lutze | B29C 59/007 |
| | | | 280/728.3 |
| 2006/0261578 A1* | 11/2006 | Cowelchuk | B60R 21/2165 |
| | | | 280/728.3 |
| 2010/0099239 A1* | 4/2010 | Dunne | B23K 26/0622 |
| | | | 438/463 |
| 2012/0315446 A1* | 12/2012 | Wisniewski | B32B 38/0004 |
| | | | 428/195.1 |
| 2015/0352670 A1* | 12/2015 | Lutze | B23K 26/032 |
| | | | 264/400 |
| 2016/0067821 A1* | 3/2016 | Lutze | B60R 21/2165 |
| | | | 219/121.69 |

FOREIGN PATENT DOCUMENTS

| | | | | |
|---|---|---|---|---|
| EP | 2266746 A2 | | 12/2010 | |
| JP | 2001097164 A | * | 4/2001 | |
| JP | 2004175121 A | * | 6/2004 | |
| JP | 2005014059 A | * | 1/2005 | B23K 26/0604 |

OTHER PUBLICATIONS machine translation of Japan Patent document No. 2005-014,059-A, Jul. 2019.* machine translation of Japan Patent document No. 2004-175,121-A, Jul. 2019.*

* cited by examiner

VEHICLE INTERIOR PANEL WITH LASER-FORMED TEAR SEAM

TECHNICAL FIELD

The present disclosure relates generally to vehicle interior panels and is particularly pertinent to vehicle interior panels that include airbag tear seams.

BACKGROUND

Inflatable airbags are hidden in non-visible areas of modern vehicles, where they wait to perform their safety function in the event of a collision. When a collision is detected, these devices inflate in a fraction of a second, suddenly protruding from their hiding spots and into the passenger cabin to help prevent vehicle occupants from colliding with more rigid and thus more dangerous parts of the vehicle, such as the windshield, steering wheel, door frame, etc. When the uninflated airbag is concealed behind a vehicle interior panel, at least part of the panel must be quickly moved away to make room for the inflating airbag when it is deployed. In some cases, a deployment opening is formed through the panel by the airbag itself, which applies a large amount of force in a short period of time to the concealing panel. Airbag tear seams have been developed to allow vehicle designers to precisely locate such deployment openings. Efforts have been made to make airbag tear seams invisible to vehicle occupants to provide a passenger cabin environment that is more aesthetically pleasing and less utilitarian in appearance.

U.S. Pat. No. 7,976,764 to Schlemmer et al. discloses a technique for locally weakening a multi-layered composite trim piece for an automotive vehicle material so the trim piece predictably tears along the locally weakened section upon airbag deployment or in the event of a crash. The technique includes forming blind holes in the trim piece from the back side so that the weakened section is not necessarily visible from the front side. The technique relies on the holes being formed in the trim piece only after the multiple layers are assembled together as a single component and also requires multiple different laser powers—i.e., a relatively high-wattage laser forms part of the holes in one layer, and a relatively low-wattage laser forms part of the holes in other layers.

SUMMARY

In accordance with various embodiments, a method of forming an airbag tear seam in a vehicle interior panel includes the step of forming a plurality of blind cuts spaced apart along a tear seam pattern in a side of an upholstery layer opposite a decorative side. This step is performed before the upholstery layer is disposed over a semi-rigid substrate as part of the vehicle interior panel. Each one of the blind cuts is formed by removing material from the upholstery layer at a plurality of overlapping locations using a laser beam, and each one of the blind cuts is formed with a non-uniform depth.

In some embodiments, the material removed at each of the overlapping locations is removed by a discrete laser pulse.

In some embodiments, the step of forming includes removing material from the upholstery layer at each one of the plurality of overlapping locations more than one time, each time by a discrete laser pulse.

In some embodiments, a portion of each blind cut is formed before any of the blind cuts are complete.

In some embodiments, the step of forming includes the step of removing a first portion of material at each of the overlapping locations of each of the blind cuts in a first cutting pass and, subsequently, the step of removing a second portion of material at each of the overlapping locations of each of the blind cuts in a second cutting pass. Each first portion of material and each second portion of material is removed by a discrete laser pulse.

In some embodiments, the step of forming is performed in a plurality of sequential cutting passes. A portion of each of the plurality of blind cuts is formed in each of the sequential cutting passes, and discrete laser pulses remove material from the upholstery layer at a plurality of spaced apart locations during at least one of the sequential cutting passes.

In some embodiments, the step of forming includes the step of forming a groove portion of each of the blind cuts in a first plurality of sequential cutting passes and, subsequently, the step of forming a finger portion of each of the blind cuts in a second plurality of sequential cutting passes. Material is removed from the upholstery layer at a plurality of overlapping locations during the first plurality of cutting passes, and material is removed from the upholstery layer at a plurality of spaced apart locations within each groove portion during the second plurality of cutting passes.

In some embodiments, the upholstery layer comprises a layer of leather that provides the decorative side of the upholstery layer, and each of the blind cuts extends partly through the layer of leather.

In some embodiments, the upholstery layer is a layer of leather so that all of the material removed from the upholstery layer during the step of forming is from the layer of leather.

In some embodiments, the step of forming includes removing material from the upholstery layer using a plurality of discrete laser pulses each having a duration of less than one picosecond.

In some embodiments, the step of forming is performed using a laser scanner configured to direct the laser beam from a static source location to a plurality of different locations along the tear seam pattern to remove material from the upholstery layer at the plurality of different locations while the upholstery layer is also static.

In accordance with various embodiments, a vehicle interior panel for use over a deployable airbag includes a semi-rigid substrate, a layer of decorative material disposed over the substrate, and an airbag tear seam. The substrate is configured for deployment of the airbag therethrough. The layer of decorative material has a decorative side that faces an interior of a passenger cabin of a vehicle when the panel is installed in the vehicle and an opposite side that faces the substrate. The tear seam includes a plurality of blind cuts formed in the opposite side of the layer of decorative material along a tear seam pattern. Each blind cut is spaced apart from an adjacent one of the blind cuts in a lengthwise direction along the tear seam pattern by a material bridge comprising uncut decorative material, and each blind cut has a length greater than a length of the material bridge.

In some embodiments, each of the blind cuts has a non-uniform depth.

In some embodiments, the layer of decorative material has a grain pattern formed in the decorative side that provides the layer of decorative material with a non-uniform thickness. Each of the blind cuts has a maximum depth corresponding to a maximum thickness of the layer of decorative material and a minimum depth corresponding to a minimum thickness of the layer of decorative material.

In some embodiments, the layer of decorative material is leather.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

Described below is a vehicle interior panel including an airbag tear seam that can be formed as a plurality of blind cuts arranged along a tear seam pattern. Each one of the blind cuts may be formed by laser material removal at a plurality of locations along an upholstery layer of the panel before the upholstery layer is assembled as part of the interior panel. In an exemplary method, laser energy is delivered to the upholstery layer in a series of ultra-short pulses to form the blind cuts in the upholstery layer while separate from an interior panel substrate. This technique and tear seam configuration is particularly useful with leather upholstery materials, in which non-visible and functional airbag tear seams have been proven difficult to form.

Figure 1:
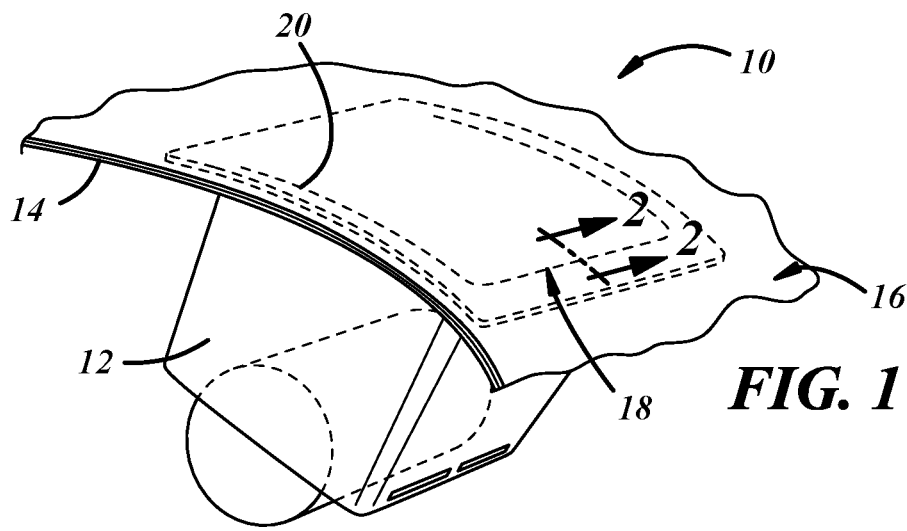
FIG. 1 is a cutaway perspective view of an embodiment of a portion of a vehicle interior panel illustrated over an airbag module and including an airbag tear seam.

FIG. 1 is a perspective view of an embodiment of a vehicle interior panel 10 illustrated over an airbag module 12 affixed to an underside of the panel. The panel 10 includes a semi-rigid substrate 14 and an upholstery layer 16 disposed over the substrate. A non-visible airbag tear seam 18 is formed in the upholstery layer along a tear seam pattern 20, which is a U-shaped pattern in the illustrated example. Other examples of tear seam patterns include H-shaped, X-shaped or Y-shaped patterns. The portion of the panel 10 illustrated in FIG. 1 is a passenger side of a vehicle instrument panel, but these teachings are applicable to any vehicle interior panel arranged over a deployable airbag in which it is desired to deploy the airbag through the panel by using airbag inflation forces to predictably tear the upholstery layer 16 along a deployment opening. Other examples of vehicle interior panels include interior door panels, steering wheel panels, seat panels, pillar panels, and roof panels, to name a few.

The substrate 14 provides the overall shape and structure of the panel 10. An example of a suitable semi-rigid construction is injection molded glass-reinforced polypropylene having a wall thickness in a range from 2.0 mm to 4.0 mm. Other materials and combinations of materials exhibiting similar shape-maintaining characteristics may be used. The substrate 14 is described as semi-rigid to distinguish from perfectly rigid (i.e., entirely inflexible), but should be sufficiently rigid to support its own weight and the weight of the upholstery layer 16, along with any other attached components, without noticeable sagging or bending. The substrate 14 is configured for deployment of the airbag therethrough. In the example illustrated in the cross-sectional view of FIG. 2, an airbag door 22 is molded into the substrate 14 and defined by a gap or slot 24 along an edge 26 of the door that moves away from the remainder of the substrate in the direction A shown when the airbag inflates. In another example, the substrate 14 has a notch or other stress concentrator molded or cut into the substrate as a substrate tear seam along which the airbag door is formed when the airbag inflates. Or the substrate 14 may have full-size airbag deployment opening molded through its thickness with an underlying airbag module providing a hinged door that supports the upholstery layer 16 over the opening. Other arrangements are possible.

Figure 2:
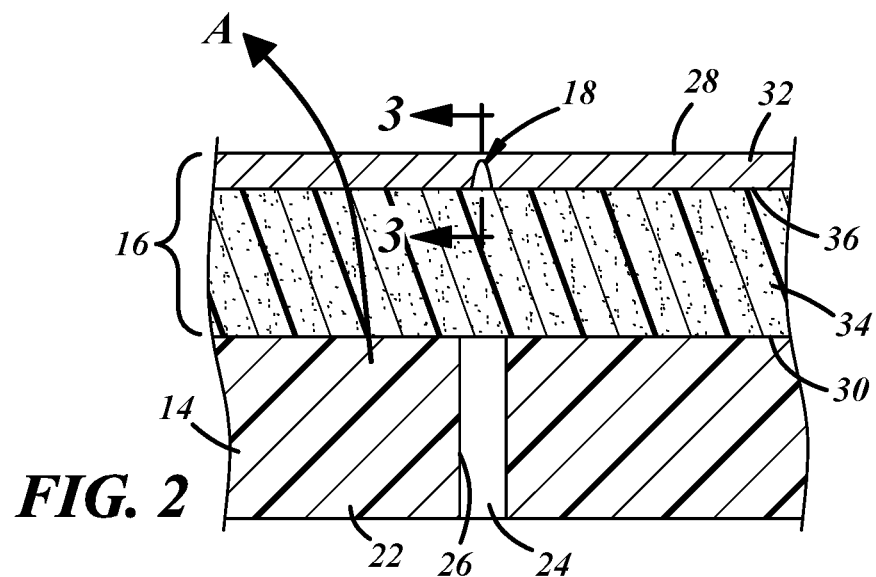
FIG. 2 is a partial cross-sectional view taken across the tear seam of FIG. 1.

The upholstery layer 16 includes the tear seam 18 and is a primarily aesthetic component that provides a desired appearance, texture, and tactile feel to the panel 10 and may itself include multiple layers. The upholstery layer 16 has a decorative side 28 that faces an interior of a passenger cabin of the vehicle in which the panel 10 is installed, as well as an opposite non-visible side 30 that faces the substrate 14 in the assembled panel. In the example of FIG. 2, the upholstery layer 16 includes a layer 32 of decorative material and an interlayer 34 disposed between the substrate 14 and the decorative layer 32. The decorative layer 32 provides the decorative side 28. An opposite side 36 of the decorative layer 32 faces the interlayer 34 and the substrate 14. In some embodiments, the interlayer 34 is omitted and the decorative layer 32 is the upholstery layer 16, with the opposite side 36 of the decorative layer and the opposite non-visible side 30 of the upholstery layer 16 being one and the same.

Whether multi-layered or not, the upholstery layer 16 has characteristics typical of upholstery materials in that it is provided in sheet and fabric-like form that cannot support its own weight when horizontal, relying instead on the underlying substrate 14 to which it conforms in shape. Exemplary materials for the decorative layer 32 include leather and synthetic leather or leatherette (e.g., polyurethane or plasticized PVC) materials. The decorative layer 32 may have an average nominal thickness (i.e., away from the tear seam) in a range from 0.8 mm to 1.5 mm or from 1.0 mm to 1.2 mm, though these are non-limiting ranges. Exemplary materials for the interlayer 34 include polymeric foam materials (e.g., polyurethane or polyolefin foam), spacer fabric, and natural or synthetic batting, to name a few. The interlayer 34 may act as a cushioning layer and provide the panel with a plusher tactile feel. The interlayer 34 may have a thickness in a range from 1.0 mm to 4.0 mm or from 2.0 mm to 3.0 mm, though these are non-limiting ranges. Each layer 32, 34 of the upholstery layer 16 may be separately provided or provided together as a single component (e.g., adhered or laminated together). In the example of FIG. 2, the interlayer 34 is illustrated without a tear seam. In other embodiments, the illustrated tear seam 18 extends at least partially through the interlayer 34. In some embodiments, the interlayer 34 is provided with a separately formed tear seam, such as perforations that are generally aligned with the tear seam 18 in the decorative layer 32 in the finished panel.

Figure 3:
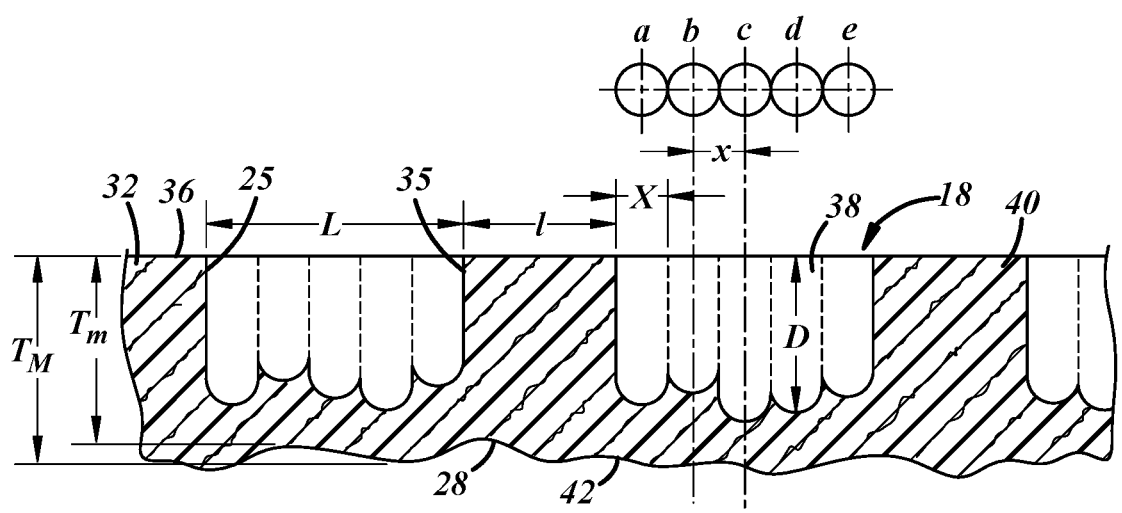
FIG. 3 is a partial cross-sectional view of a decorative layer of the interior panel of FIG. 2, illustrating a plurality of blind cuts that partly define the tear seam.

FIG. 3 is a cross-sectional view of the decorative layer 32 only, taken along the direction of the tear seam pattern 20 (i.e., along the U-shape) of FIG. 1. In this enlarged view, the decorative layer 32 is illustrated upside down with respect to FIGS. 1 and 2, and an exemplary tear seam 18 is shown in greater detail. The orientation of FIG. 3 may be a preferred orientation during tear seam formation, with the decorative side 28 face down. The tear seam 18 includes a plurality of blind cuts 38 formed in the opposite side of the decorative layer. Each blind cut 38 has a length L defined between a first end 25 and a second end 35 and is separated from adjacent blind cuts by a material bridge 40 having a length l. The illustrated tear seam 18 is thus an alternating pattern of blind cuts 38 and uncut material bridges 40.

Each blind cut 38 extends from the opposite side 36 of the decorative layer 32 and only partially through the decorative layer to a depth D, which is a non-uniform depth in FIG. 3. Each blind cut 38 also represents a continuous void volume within the thickness of the decorative layer 32 or upholstery layer. The average depth D of each blind cut 38 is a function of at least the local nominal thickness of the decorative layer 32, and the length l of the material bridges 40 (i.e., the spacing between adjacent blind cuts 38). The tear seam 18 should be formed such that, when the airbag underlying the assembled interior panel inflates, the upholstery layer tears along the tear seam 18 to allow the airbag to pass through the deployment opening in the panel. But this is not the only consideration. The tear seam 18 should also be formed such that its presence in the finished panel is not noticeable when the panel is viewed from the passenger cabin of the vehicle for the intended life of the vehicle. In other words, it is desirable that the tear seam 18 includes sufficient structure so that factors such as repeated thermal expansion or contraction, long-term material relaxation, or material degradation do not cause the location of the tear seam to visibly appear at the decorative side of the panel.

This balance between proper tear seam function and long-term tear seam invisibility has been particularly difficult to achieve with leather materials due to a number of factors related to the fact that leather is a natural material. For instance, a given piece of leather may have a non-uniform thickness and/or non-uniform strength, and one piece of leather may have a thickness and/or strength different from another piece of leather. These are problems that are not as prevalent with synthetic materials. Additionally, leather can be stronger than thermoplastic polymer films, requiring a more aggressive tear seam which is more likely to become visible at the decorative side of the panel over time. Also, methods of forming tear seams in polymeric materials, such as mechanical cutting or laser scoring, are not easily adaptable to leather. Lasers configured to melt or vaporize thermoplastic materials may only char and degrade leather materials, for example. Tear seams configured and formed as outlined below thus address a long felt and unresolved need in the art of airbag tear seams.

Contrary to the teachings of the aforementioned Schlemmer patent, a preferred method of forming the tear seam 18 includes forming the plurality of blind cuts 38 before disposing the upholstery layer 16 over the panel substrate 14. Each one of the blind cuts 38 is formed by removing material from the upholstery layer 16 at a plurality of overlapping locations using a laser beam. In the example of FIG. 3, each blind cut 38 is formed by removing material from the decorative layer 32 at five overlapping locations, designated a through e in the inset top view of FIG. 3. Each of said locations a-e represents a projected area of the decorative layer 32, each having a diameter or width X generally defined by the diameter of the laser beam. For purposes of this description, each individual location a-e at which material is removed is said to be overlapping another when a distance x between the centers of each location is greater than zero and less than or equal to the diameter or width X of the locations ($0 > x \geq X$). In the illustrated example, x=X with adjacent removal locations (e.g., a and b, b and c, etc.) sharing a boundary represented by broken lines in the cross-section of FIG. 3.

The non-uniform depth D of each blind cut 38 is at least partly a result of laser material removal at a plurality of locations within the same blind cut, which gives the end of each blind cut 38 a scalloped configuration or shape as shown in FIG. 3. Additionally, in the illustrated example, more material is removed at one removal location than another within the same cut 38. For instance, more material is removed at removal location c than at removal locations a or e. This provides the blind cut 38 with a non-uniform depth D even if the end of the cut 38 at each removal location was flat rather than rounded as shown. In the example of FIG. 3, the depth D at each individual removal location is a function of the thickness of the decorative layer at the same location. Within the length L of the leftmost blind cut 38 of FIG. 3, for example, the decorative layer 32 has a minimum thickness $T_m$ and a maximum thickness $T_M$, and more material is removed from at the maximum thickness region than at the minimum thickness region. This has the effect of keeping the residual wall thickness (T−D) relatively constant at each removal location, even when the decorative layer 32 has a non-uniform thickness.

As noted above, leather materials sometimes naturally have a non-uniform thickness within the same piece of material, making formation of blind cuts with a corresponding non-uniform depth particularly useful with leather materials. The decorative layer 32 may also have a grain pattern 42 embossed or otherwise formed in the decorative side 28, whether or not the layer 32 is leather. For instance, some polymeric decorative layers 32 have a grain pattern embossed into the decorative side by calendaring the sheet material or via an in-mold graining (IMG) process. Because the depth of such a grain pattern can be a relatively significant portion of the overall thickness of the decorative layer 32, formation of blind cuts 38 with a non-uniform depth as part of the tear seam 18 can be advantageous with non-leather materials as well.

FIGS. 4A-4D depict a portion of an embodiment of a method of forming the tear seam 18. The method employs a laser beam 100 directed from a laser source 110 of a laser system toward the upholstery layer 16, which in this case is the decorative layer 32, so that the laser beam impinges the side 36 of the upholstery layer opposite the decorative side 28. The laser system is configured to controllably aim the laser beam 100 at any of the plurality of areal locations a-e associated with each blind cut to be formed along the tear seam pattern, such as via a programmable motion controller. In this particular example, the laser beam 100 impinges the decorative layer 32 with a zero angle of incidence (i.e., perpendicular to the side 36 facing the laser source 110), with the beam moving relative to the decorative layer in the direction indicated by the outline arrow in FIG. 4A.

As apparent in FIGS. 4A-4D, which are shown in sequence during the exemplary method, each blind cut 38 is formed in multiple cutting passes of the laser beam 100 along the tear seam pattern with only a portion of each blind cut being formed in each successive pass. In some embodiments, the laser beam 100 arrives at the decorative layer 32 in ultra-short and discrete laser pulses. As used herein, ultra-short laser pulses are laser pulses having a duration of less than 100 picoseconds (ps). A picosecond laser system delivers laser pulses having a duration at the higher end of this range—i.e., greater than or equal to 1 ps. A femtosecond laser system delivers laser pulses having a duration greater than or equal to 1 femtosecond (fs) and less than 1 ps (1000 fs). In a particular embodiment, the duration of the laser pulses is in a range from 400 fs to 700 fs using a laser having a wattage in a range from 5 W to 20 W, with each individual laser pulse delivering energy to the decorative layer 32 on a microjoule (µJ) scale—in a range from 25 µJ to 100 µJ, for example.

Figure 4A:
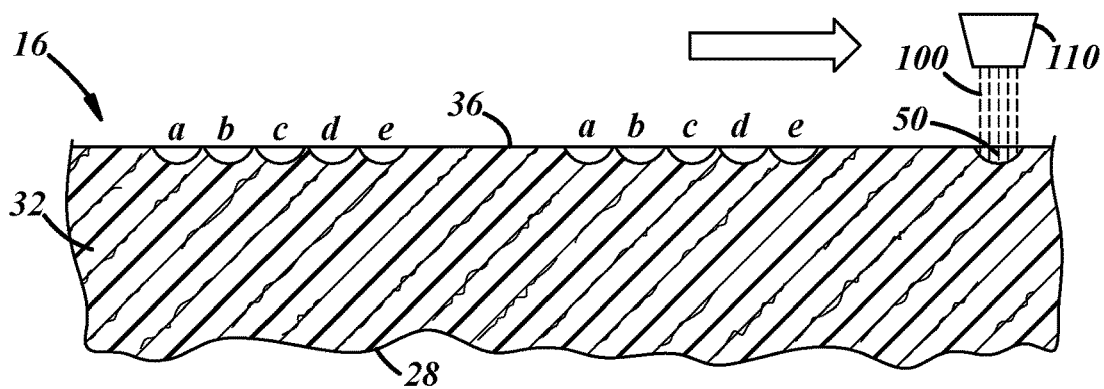
FIGS. 4A-4D sequentially illustrate the decorative layer of FIG. 3 during an exemplary method of forming the tear seam via laser material removal.

FIG. 4A depicts the decorative layer 32 during a first cutting pass of the pulsed laser beam 100. In this illustration, a first portion 50 of material has been removed from some groups of overlapping removal locations a-e to form a first portion of the associated blind cuts 38. The pulsed laser beam 100 is shown during removal of one of the first portions 50 of material. The material removed at each of the overlapping locations is removed by a discrete laser pulse or pulse burst. A pulse burst includes a plurality of ultra-short laser pulses delivered at a high-frequency, such as 100 kHz to 500 kHz. For example, one or more ultra-short laser pulses remove material from the decorative layer 32 at location a of one blind cut, then one or more ultra-short laser pulses remove material at overlapping location b of the same blind cut, then locations c, d, and e of the same blind cut, repeating this sequence at each blind cut location along the tear seam pattern. This is only an exemplary sequence, however, as material can be removed by laser pulses at each location a-e of each blind cut in any sequence.

Figure 4B:
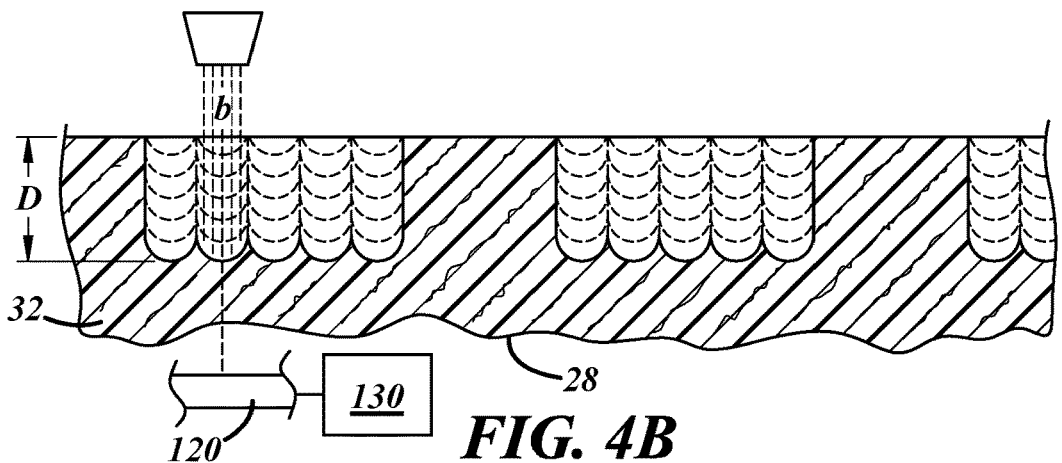

FIG. 4B depicts the decorative layer during a subsequent cutting pass and after a plurality of sequential cutting passes that were substantially identical to the first cutting pass. Material portions removed at each removal location during each sequential cutting pass are depicted schematically in broken lines. At this point in the process, essentially the same amount of material has been removed at each of the plurality of locations a-e associated with each blind cut 38. FIG. 4B also depicts the final cutting pass during which material is removed from all locations a-e of all blind cuts, as one of the blind cuts has reached its final depth D at location b. In the subsequent cutting passes depicted in FIGS. 4C and 4D, no material is removed at that particular location.

Whether each blind cut has reached its final depth at each location a-e within the cut during each sequential cutting pass can be determined via a light sensor 120 of the laser system located at the decorative side 28 of the layer 32. Such a sensor 120 or a portion thereof is present along the entire tear seam pattern during the laser material removal process, but is shown only in FIG. 4B for simplicity in illustration. A portion of the light of the laser beam 100 will pass through the remaining thickness of the decorative layer 32 and reach the sensor 120 when the thickness is sufficiently reduced. The intensity of the light that reaches the sensor 120 is inversely proportional to the locally remaining thickness of the decorative layer 32. This intensity can be continuously monitored by a system processor 130 along the entire tear seam pattern and correlated with each material removal location of each blind cut. When the intensity reaches a threshold value at one or more removal location during a particular cutting pass, laser pulses are not delivered to the correlated locations in any subsequent cutting passes. The residual wall thickness can be thus kept relatively uniform among the plurality of material removal locations of each blind cut, even with a grained or otherwise non-uniform decorative side 28 that imparts the layer with a non-uniform thickness. This technique is non-limiting, as other methods of controlling the residual wall thickness of each blind cut 38 and/or within each blind cut may be employed.

Figure 4C:
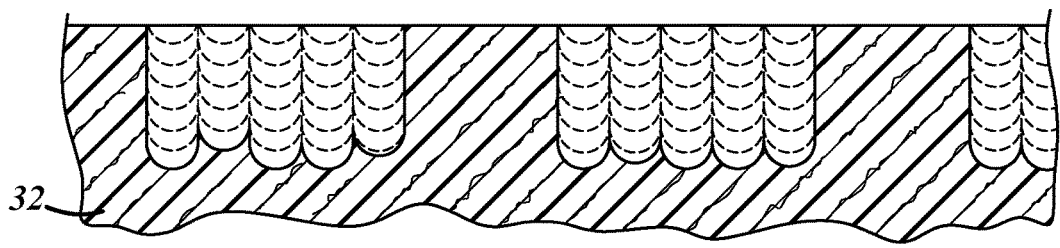
Figure 4D:
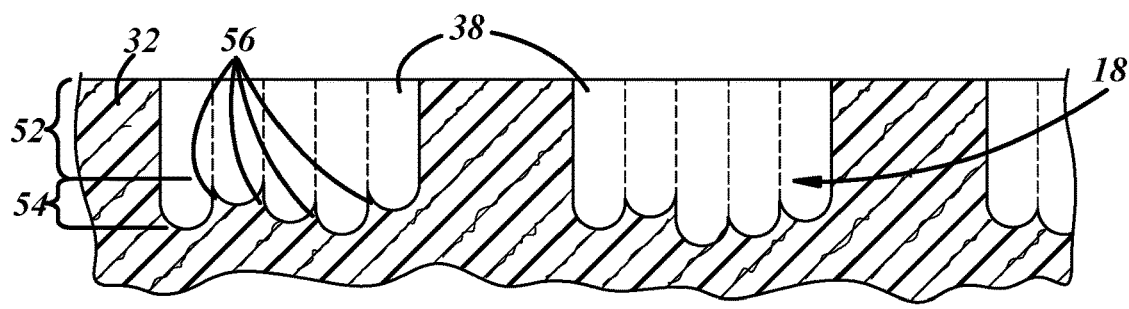

FIG. 4C depicts the decorative layer 32 after one or more additional cutting passes and illustrates some additional material removal locations that previously reached their final depth, and FIG. 4D depicts the decorative layer after all cutting passes are complete with all blind cuts 38 being formed to the desired non-uniform depth as in FIG. 3.

The completed blind cuts 38 may be characterized by a groove portion 52 and a finger portion 54 that define each blind cut. The groove portion 52 is defined in the last cutting pass during which material is removed from all of the plurality of overlapping locations a-e of a given blind cut 38—i.e., the cutting pass of FIG. 4B in this example. The groove portion 52 is formed before the finger portion 54 and extends into the material thickness to a depth at which a pair of adjacent removal locations no longer overlap. The finger portion 54 extends farther into the thickness of the material from the groove portion 52 and includes the remainder of the blind cut 38. Such a groove-and-finger configuration is believed to help prevent the tear seam from becoming visible at the decorative side 28 of the finished panel over time due to the presence of interfinger portions 56 of material. These interfinger portions 56 provide structure and additional resistance to bending or sagging of material where the thickness has been substantially reduced via formation of the blind cuts 38 of the tear seam.

Figure 5:
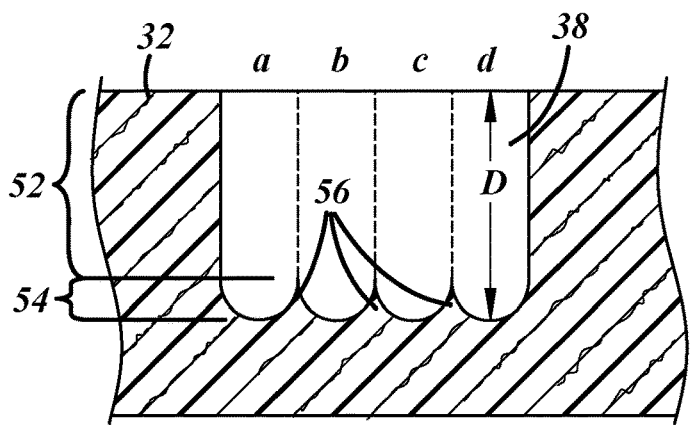
FIG. 5 is a cross-sectional view of a portion of the tear seam illustrating one configuration for the blind cuts.

This particular advantage may be realized even if the blind cuts 38 are formed to the same depth at each of the plurality of removal material locations, as illustrated in the example of FIG. 5. In this case, the illustrated blind cut 38 is formed via laser material removal at a plurality of overlapping locations a-d, with material removed to the same depth at each location. The resulting blind cut 38 still has a non-uniform depth D, a groove portion 52, a finger portion 54, and associated interfinger portions 56 of material.

Figure 6:
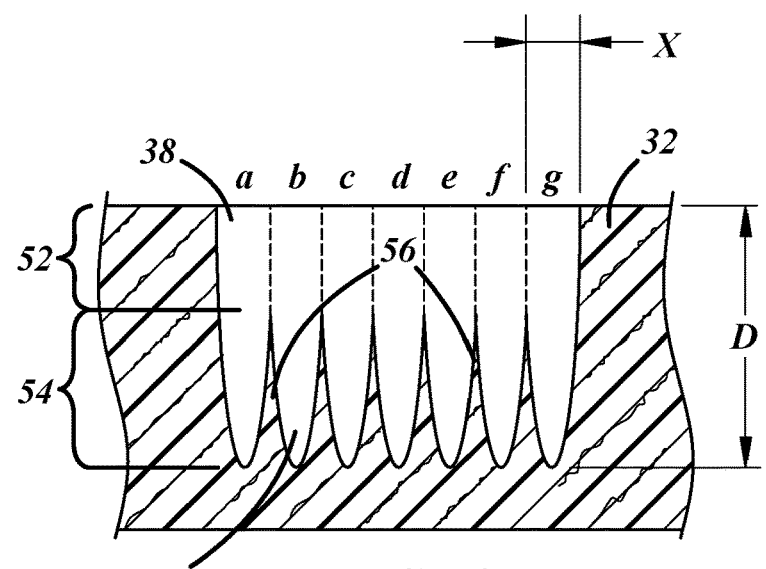
FIG. 6 is a cross-sectional view of a portion of the tear seam illustrating another configuration for the blind cuts.

In the example of FIG. 6, the blind cut 38 is also formed with a non-uniform depth D, a groove portion 52, a finger portion 54, and associated interfinger portions 56 of material. In this case, the interfinger portions 56 are more pronounced and include more material than in the previous examples. Material is removed from the decorative layer 32 at a larger number of overlapping locations a-g in the illustrated blind cut 38, and each location has a smaller diameter or width X. Also, the shape of each finger 58 of the finger portion 54 is different from the previous examples, being generally conical or elliptical in shape at the blind end rather than arcuate as in the previous examples. As a result, the finger portion 54 is a larger portion of the overall thickness of the material than the groove portion 52, and the interfinger portions 56 may provide additional structure to help prevent tear seam visibility or read-through at the decorative side of the finished panel over time. This finger shape may be obtained in various ways, such as by altering the areal power distribution of the laser beam to be more powerful at the center of the beam, or by directing the laser beam at the material with a non-zero angle of incidence.

Figure 7:
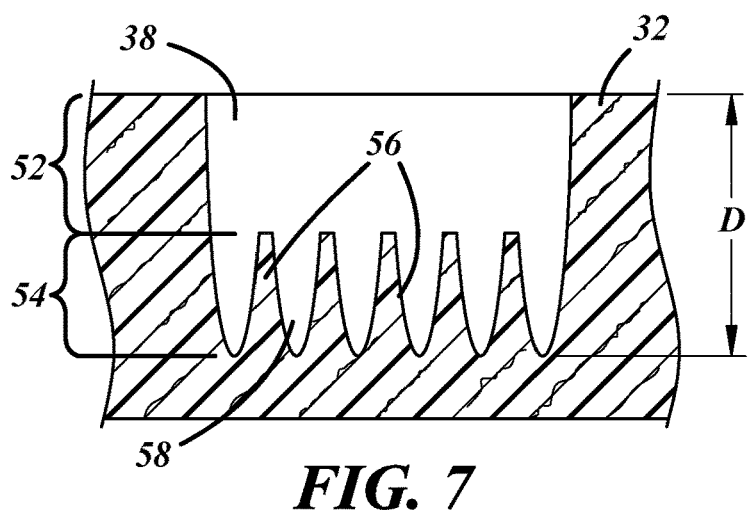
FIG. 7 is a cross-sectional view of a portion of the tear seam illustrating another configuration for the blind cuts.

In the example of FIG. 7, the blind cut 38 is also formed with a non-uniform depth D, a groove portion 52, a finger portion 54, and associated interfinger portions 56 of material. In this case, the groove portion 52 occupies a larger portion of the material thickness than in FIG. 6, while the finger portion occupies a lesser portion of the material thickness. In this example, the individual fingers 58 of the finger portion 54 are the same shape as in FIG. 6, but there is one less finger within the same length of blind cut 38 with corresponding more interfinger portion 56 material thickness between adjacent fingers. This configuration of the blind cut 38 can be formed by removing material from overlapping locations (e.g., a-g of FIG. 6) during formation of the groove portion 52, then subsequently forming the finger portion 54 at non-overlapping locations. In this case, the finger portion 54 is formed by removing material at six spaced apart, non-overlapping locations. The spacing between material removal locations can be increased as a step increase after the desired groove depth is attained, and/or the spacing between material removal locations can be gradually increased as the blind cut is made deeper.

Other variations include flat-ended fingers, and various combinations of features from the examples of FIGS. 4-7, such as each of the individual material removal locations being formed to different depths in the examples of FIGS. 5-7 using the sensor system of FIG. 4, for example.

Figure 8:
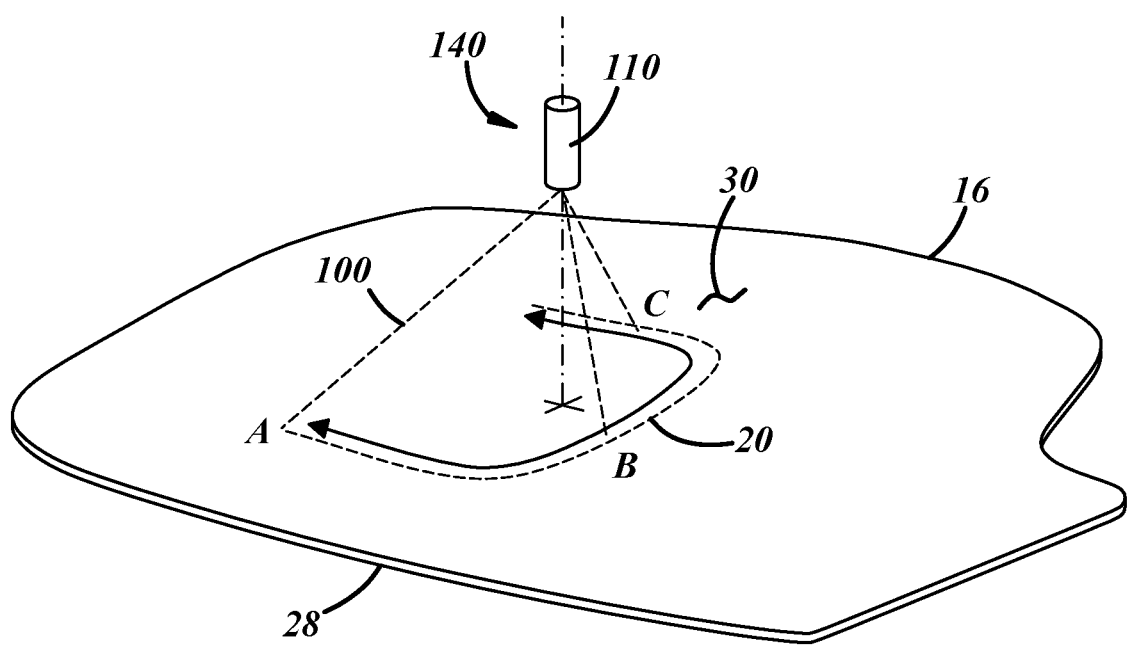
FIG. 8 is a schematic perspective view of a laser scanner configured to form the tear seam in the upholstery layer.

In some embodiments, the laser system used to form the tear seam in the upholstery layer 16 includes a laser scanner 140 configured to direct the laser beam 100 from the laser source 110 to a plurality of different locations along the tear seam pattern 20 to remove material from the upholstery layer while both the laser source 110 and the upholstery layer 16 are held in static positions, not moving relative to each other. FIG. 8 schematically illustrates such a system, in which the upholstery layer 16 is supported from below at the decorative side 28 at a fixed location. The laser source 110 is also at a fixed location above the upholstery layer 16 near the center of the pattern 20. The laser source 110 is shown directing the laser beam at three different locations A, B, C along the tear seam pattern 20. The laser source 110 may guide the beam 100 continuously along the tear seam pattern 20 from point A to point B to point C and back, for example, and to any other points along the pattern. Tiltable or otherwise movable optics may be provided at the laser source 110 to achieve the illustrated scanning capability, and the system may be further equipped with additional optics to adjust the focal point of the laser beam as it moves along the pattern and the distance between the source 110 and the upholstery layer 16 changes. This is only one example of a laser scanner 140 and scanning sequence. For example, the laser beam may be directed along a series of parallel raster lines instead of directly following the shape of the pattern.

As is apparent from the above description, there are multitudes are variables in the material removal process and in the resulting tear seam, upholstery layer, and interior panel. The various dimensional and process variable ranges outlined below are thus non-limiting, as each individual dimension or process variable may depend on others.

With reference to FIG. 3, some embodiments include blind cuts 38 having a length L that is greater than the length l of the interposed material bridge 40. In some cases, the blind cut length L may be double the bridge length l, or from 1.25 to 1.75 times the bridge length l. This is unconventional in tear seams formed in upholstery materials and highlights one of the long-felt problems with leather upholstery: a very large portion of the cross-sectional area of the material must be removed along the tear seam to sufficiently weaken the leather for proper tear seam function, but removal of such a large portion from the non-visible side usually causes read-though at the visible side of the leather. The above described method and blind cut structure allows for these relatively long blind cuts along the tear seam with relatively short material bridges therebetween.

In a specific example, the upholstery layer 16 is a layer of leather material having a thickness in a range from 1.0 mm to 1.2 mm. The tear seam 18 includes alternating blind cuts 38 and material bridges 40 along the tear seam pattern. Each blind cut 38 has a length L in a range from 1.2 mm to 1.5 mm, and each material bridge 40 has a length l in a range from 0.6 mm to 0.8 mm. The average depth of each blind cut 38 is in a range from 0.5 mm to 0.7 mm, or about ½ to ⅔ of the total leather thickness. As such, up to about 50% of the cross-sectional area of the upholstery layer 16 may be removed along the centerline of the tear seam 18 while maintaining long-term tear seam invisibility at the decorative side of the panel.

In another particular example, with a leather upholstery layer 16 having the same thickness range, each blind cut has a length L of about 1.25 mm with intervening material bridges having a length l of about 0.75 mm. In this example, with reference to FIG. 3, each of five overlapping material removal locations a-e has a diameter X and center-to-center spacing x of 0.25 mm. In another example with the same upholstery layer, each blind cut has a length L of about 1.5 mm with 0.8 mm material bridges between each blind cut and seven overlapping material removal locations per blind cut, each removal location having a diameter of about 0.25 mm.

The above-described laser material removal technique has been surprisingly successful with leather materials, given the overall previous failure of any commercially available laser-formed tear seams in leather. As noted above, the complex natural material composition (e.g., collagen, proteins, etc.) makes its reaction to typical plastic laser-scoring processes very different, since leather does not melt or vaporize like thermoplastic materials. The above-described success is due in part to the pulsed laser beam with ultra-short pulses. Each ultra-short pulse delivers sufficient energy to locally disrupt molecular bonds without causing the surrounding material to absorb heat. Ultra-short laser pulses thus allow material removal in very small portions. Even a pulsed laser directed at a single location will result in a smaller heat-affected zone than non-pulsed laser. The above-described method including a plurality of sequential cutting passes along the tear seam pattern takes the delay between laser pulses at the same location a step further by sending the laser beam on to a different blind cut location to remove more material after a new portion is removed from each blind cut location.

The number of cutting passes is illustrated only schematically in FIGS. 4A-4D. In some embodiments, the number of cutting passes is in a range from 25 to 75. With a leather upholstery layer having a thickness in a range from 1.0 mm to 1.2 mm, the number of cutting passes may be in a range from 40 to 60, with 0.01 mm to 0.02 mm of material thickness removed in each cutting pass. In some cases, less than 0.01 mm down to about 0.005 mm of material thickness is removed in each cutting pass.

As noted above, the average depth of the blind cuts and the associated residual wall thickness required to achieve proper tear seam function without tear seam read-through may vary from material to material. It has been determined that, when formed in a leather upholstery layer having a nominal width of 5 cm (50 mm) and a nominal thickness of 1.1 mm, an applied tensile force to tear the upholstery layer should be within a particular range to repeatably achieve proper tear seam function and maintain tear seam invisibility after accelerated aging tests. An applied maximum tensile force to break in a range from 300 N to 600 N is sufficient for automotive interior grade leather materials, which typically have a maximum tear strength of 900 N to 1100 N without a tear seam. Normalized for material thickness, the desired ultimate tensile strength after tear seam formation is in a range from about 5.5 MPa to about 10.9 MPa, compared to a range from 16.5 MPa to 20 MPa without the tear seam. These ranges are of course non-limiting due to so many interrelated variables, as available airbag deployment forces will affect at least the maximum allowable upholstery strength, and leather processing such as tanning and color or chemical treatment may affect the materials relaxation properties over time.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of forming an airbag tear seam in a vehicle interior panel comprising an upholstery layer disposed over a semi-rigid substrate, the method comprising the step of:
   forming a plurality of blind cuts spaced apart along a tear seam pattern in a side of the upholstery layer opposite a decorative side before the upholstery layer is disposed over the substrate, wherein at least a portion of each one of the blind cuts is formed by removing material from the upholstery layer at a plurality of overlapping locations using a laser beam, wherein the step of forming the plurality of blind cuts includes the steps of:
   forming a groove portion of each of the blind cuts in a first plurality of sequential cutting passes along the tear seam pattern during which material is removed from the upholstery layer at a plurality of overlapping locations; and, subsequently,
   forming a finger portion of each of the blind cuts in a second plurality of sequential cutting passes along the tear seam pattern during which material is removed from the upholstery layer at a plurality of locations within each groove portion, each finger portion comprising a plurality of discrete fingers extending from the groove portion toward the decorative side of the upholstery layer,
   wherein one finger of each finger portion is defined at a first end of the corresponding blind cut, another finger of each finger portion is defined at an opposite second end of the corresponding blind cut, and the remaining fingers of each finger portion are equally spaced between the fingers at the first and second ends of the corresponding blind cut, and
   wherein each blind cut has a scalloped configuration comprising an interfinger portion of upholstery material remaining between each pair of adjacent fingers.

2. The method of claim 1, wherein the material removed at each of the overlapping locations is removed by a discrete laser pulse.

3. The method of claim 1, wherein the step of forming the groove portion includes removing material from the upholstery layer at each one of the plurality of overlapping locations more than one time, each time by a discrete laser pulse.

4. The method of claim 1, wherein a portion of each groove portion is formed before any of the groove portions are complete.

5. The method of claim 1, further comprising:
   removing a first portion of material at each of the overlapping locations of each of the blind cuts in a first cutting pass with each first portion of material being removed by a discrete laser pulse; and, subsequently,
   removing a second portion of material at each of the overlapping locations of each of the blind cuts in a second cutting pass with each second portion of material being removed by a discrete laser pulse.

6. The method of claim 1, wherein a portion of each of the plurality of blind cuts is formed in each of the sequential cutting passes, and
   wherein discrete laser pulses remove material from the upholstery layer at a plurality of spaced apart locations during at least one of the sequential cutting passes.

7. The method of claim 1, wherein
   the plurality of locations within each groove portion is a plurality of spaced apart locations.

8. The method of claim 1, wherein the upholstery layer comprises a layer of leather that provides the decorative side of the upholstery layer, each of the blind cuts extending partly through the layer of leather.

9. The method of claim 8, wherein the upholstery layer is the layer of leather so that all of the material removed from the upholstery layer by the laser beam is from the layer of leather.

10. The method of claim 1, wherein each step of forming comprises removing material from the upholstery layer using a plurality of discrete laser pulses each having a duration of less than one picosecond.

11. The method of claim 1, wherein each step of forming is performed using a laser scanner configured to direct the laser beam from a static source location to a plurality of different locations along the tear seam pattern to remove material from the upholstery layer at the plurality of different locations while the upholstery layer is also static.

12. The method of claim 1, wherein the laser beam is configured to form each finger with a conical or elliptical profile.

13. The method of claim 1, wherein each finger has a width, and a sum of the widths of the fingers of each finger portion is equal to a distance between the first and second ends of the corresponding blind cut.

14. The method of claim 1, wherein each finger has a width, and a sum of the widths of the fingers of each finger portion is less than a distance between the first and second ends of the corresponding blind cut.

15. The method of claim 1, wherein the finger portion of each blind cut occupies a larger portion of a thickness of the upholstery layer than does the corresponding groove portion.

* * * * *